United States Patent [19]

Miller et al.

[11] 3,972,340

[45] Aug. 3, 1976

[54] TILT RESPONSIVE SHUT-OFF VALVE

[75] Inventors: Paul J. Miller, Richmond Heights; Harold R. Daugherty, Lyndhurst, both of Ohio

[73] Assignee: The Weatherhead Company, Cleveland, Ohio

[22] Filed: Sept. 9, 1974

[21] Appl. No.: 504,347

[52] U.S. Cl. .......... 137/38; 180/104

[51] Int. Cl.$^2$ .......... F16K 17/36

[58] Field of Search .......... 137/38, 39, 43; 180/104; 123/198 DB

[56] References Cited

UNITED STATES PATENTS

| | | | |
|---|---|---|---|
| 1,180,482 | 4/1916 | Flanders | 137/38 |
| 2,215,044 | 9/1940 | Kammerdiner | 137/38 |
| 2,619,185 | 11/1952 | Rudisill | 137/38 X |
| 2,942,612 | 6/1960 | Klank, Jr. | 137/43 |

*Primary Examiner*—Robert G. Nilson

*Attorney, Agent, or Firm*—McNenny, Pearne, Gordon, Gail, Dickinson & Schiller

[57] ABSTRACT

A gasoline powered motor vehicle is provided with a tilt rsponsive shut-off valve in its fuel line to shut-off gasoline flow from the fuel tank to the carburetor when the vehicle is tilted. The valve includes a tee shaped shut-off passage having a first branch and a second branch connected in series between the valve inlet and the valve outlet. A tilt responsive ball valve in the first branch shuts off gasoline flow when the vehicle is tilted in one direction, and another tilt responsive ball valve in the second branch shuts off fluid flow when the vehicle is tilted in the other direction. Each of the ball valves includes a ball cavity for storing the ball when the vehicle is in an upright position and a reduced diameter restrictive passage leading from the ball cavity to retain the ball in a deactuated position under normal operating conditions by providing a combination mechanical and fluid barrier.

6 Claims, 8 Drawing Figures

TILT RESPONSIVE SHUT-OFF VALVE

BACKGROUND OF THE INVENTION

This invention relates generally to fluid flow control valves, and more particularly to a normally open tilt responsive shut-off valve which closes when the valve is tilted from its normal upright position.

Gasoline engine powered motor vehicles are generally provided with a gasoline fuel tank, a carburetor, and a fuel pump for pumping the gasoline from the fuel tank to the carburetor. These components are all arranged to prevent leakage of the liquid gasoline or of gasoline vapor from the fuel system when the vehicle is in its normal upright position.

When the vehicle is tilted from its normal upright position, such as may occur in the course of an accident, gasoline from the fuel tank may flow through the fuel line and leak out the sides or top of the carburetor whether or not the engine is running. If this leakage is significant, a possible fire hazard is created due to the flammability of the fuel.

Various types of valves have been proposed to terminate flow from the fuel tank to the carburetor when the motor vehicle is tilted from its normal upright position. Valves which are used for this purpose, as well as tilt responsive shut-off valves for other purposes are disclosed in U.S. Pat. Nos. 2,619,185, 2,831,490, 3,384,423, 3,415,021, 3,747,616, and 3,807,423.

SUMMARY OF THE INVENTION

The present invention departs from these and other tilt responsive valves by providing a tilt responsive valve for a fluid system which uses a novel arrangement of passages which precludes premature closing of the valve when the valve is in a normal upright position and which assumes reliable closing when the valve is tilted.

More particularly, the invention provides a tilt responsive shut-off valve for a motor vehicle fluid fuel system. The valve includes a valve body having an inlet passage and an outlet passage and a shut-off passage. The shut-off passage is tee shaped, with the stem of the tee providing a first branch and the cross of the tee providing a second branch.

The first branch includes a valve seat and a ball which cooperate to close the first branch when the valve body is tilted in one direction. Similarly, the second branch includes a valve seat and a ball which cooperate to close communication between the inlet and outlet passages when the valve body is tilted in another direction.

When the valve body is in its normal position, the balls are each retained in a ball storage cavity in their respective branch of the shut-off passage. With the valve body in its normal position, the inlet passage intersects the first branch between the associated seat and ball of the first branch, the first branch intersects the second branch between the associated seat and ball of the second branch, and the outlet passage intersects the second branch downstream of the seat of the second branch. A reduced diameter restrictive passage is interposed in each branch between the ball cavity and the valve seat to provide a combination mechanical and fluid flow barrier for preventing fluid flow through the valve from pulling one of the balls from its cavity and affecting premature closing of the valve when the vehicle is in its upright position.

BRIEF DESCRIPTION OF THE DRAWINGS

These and other features and advantages of the invention are incorporated in the preferred embodiment of the invention shown in the drawings, wherein.

DETAILED DESCRIPTION OF THE DRAWINGS AND CLAIMS

Figure 1:
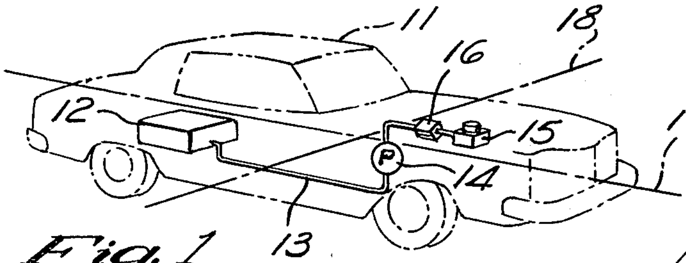
FIG. 1 is a schematic perspective view of a motor vehicle having a fluid fuel system incorporating a tilt responsive shut-off valve according to the principles of the invention.

Referring now to the drawings in greater detail, FIG. 1 shows a gasoline powered motor vehicle 11 which includes a gasoline fuel tank 12, a fuel line 13, a fuel pump 14, and a carburetor 15. These elements are conventional and well-known and need not be described in further detail.

As shown in FIG. 1, the fuel tank 12 is disposed vertically below the carburetor 15, and the pump 14 pumps fuel from the tank 12 up to the carburetor 15. Because the tank 12 is disposed vertically lower than the carburetor 15 when the vehicle 11 is in its normal or upright position shown in FIG. 1, the tank 12 moves to a position higher than the carburetor 15 when the vehicle 11 is tilted about a longitudinal axis 17 or about a lateral axis 18 such as may happen in the course of an accident.

To prevent leakage of gasoline from the tank 12 through the carburetor 15 under these circumstances, a tilt responsive shut-off valve 16 is provided in the fuel line 13 between the pump 14 and the carburetor 15. As explained in detail below, the shut-off valve 16 shuts off flow of gasoline from the tank 12 when the vehicle 11 is tilted more than a predetermined amount in either direction about the longitudinal axis 17 or about the lateral axis 18.

Figure 2:
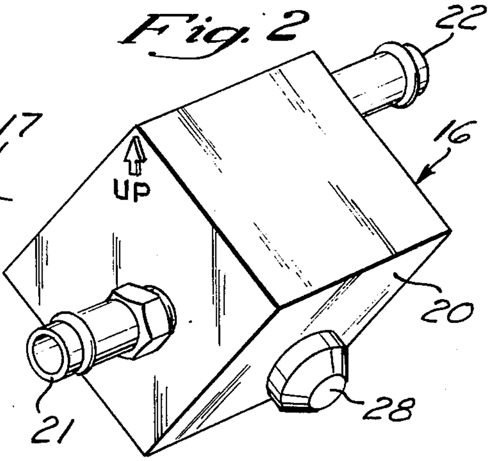
FIG. 2 is an enlarged perspective view of the tilt responsive shut-off valve shown in FIG. 1, showing the valve in its upright position.
Figure 4:
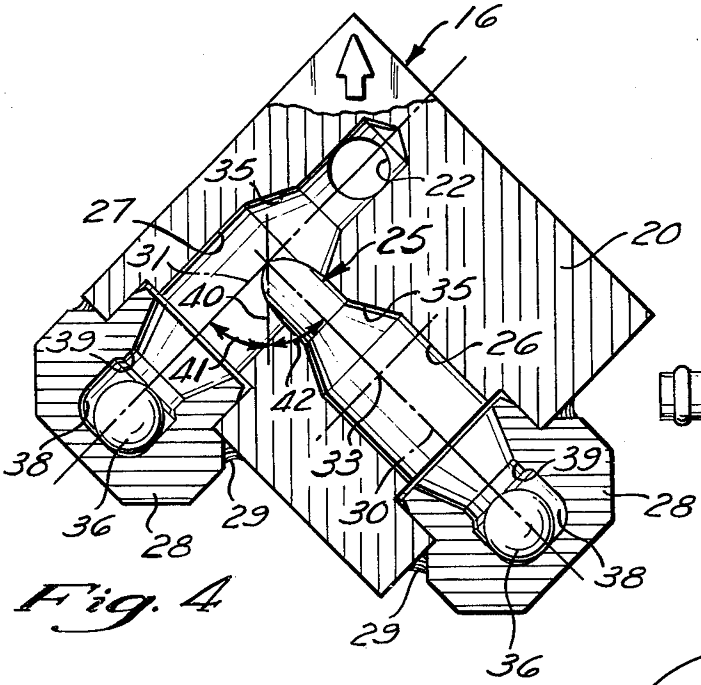
FIG. 4 is a cross-sectional view taken generally along reference line 4—4 in FIG. 3 but with branches of the shut-off passage shown substantially in the same plane for clarity, again showing the valve in its upright position.
Figure 3:
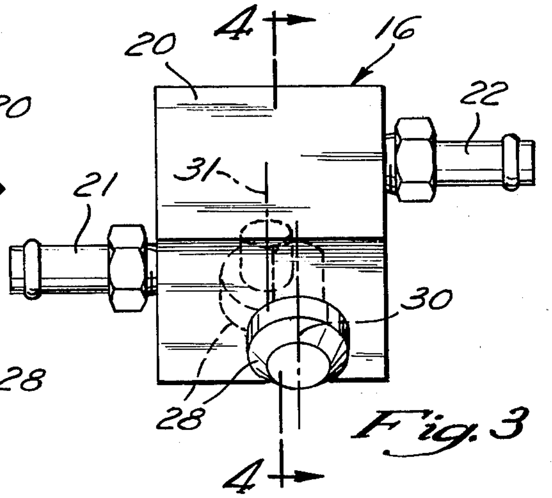
FIG. 3 is a side elevational view of the valve shown in FIG. 2, again showing the valve in its upright position.

The structural details of the shut-off valve 16 are shown in FIGS. 2, 3, and 4. The shut-off valve 16 includes a valve body 20 which is made of extruded and machined brass, but which may alternatively be of any other suitable material. The valve body 20 includes an inlet 21 and an outlet 22, each of which includes a partially threaded bore (not shown) extending longitudinally about halfway into the valve body 20 and a connector threaded into the end of such bore for being connected in the line 13, with the inlet 21 connected to the pump 14 and the outlet 22 connected to the carburetor 15.

The valve body 20 also includes a generally tee shaped shut-off passage 25 having a first branch 26 extending laterally along a centerline 30 from one side of the rectangular valve body 20 and forming the stem of the tee, and a second branch 27 extending laterally along a centerline 31 from another side of the rectangular valve body 20 and forming the cross of the tee. The open end of each of the branches 26 and 27 is closed with a brass plug 28 which is inserted therein and held in place and sealed by a bead of solder 29. The inlet passage 21 intersects the first branch 26 at the location indicated by reference numeral 33 and terminates at such location. The first branch 26 intersects the second branch 27 as shown in the drawings. The second branch 27 intersects the outlet 22, and the outlet 22 terminates at the location of such intersection. The branches 26 and 27 are not coplanar, but instead are longitudinally spaced a small amount as shown in FIG. 3 so that the first branch 26 intersects the side of the cylindrical wall of the second branch 27. This arrangement is provided so that the intersection of the first branch 26 with the second branch 27 does not interfere with movement of the shuttle ball in the second branch 27 as described in greater detail below. For clarification, the branches 26 and 27 are shown in FIGS. 4 through 7 as lying substantially in the same plane.

Each of the branches 26 and 27 includes a conical valve seat 35 having a non-locking taper and a shuttle member 36. In the preferred embodiment, the shuttle members 36 are ball bearing grade steel balls, and prior to assembly of the plugs 28 the balls 36 are seated in the conical seats 35 by lightly tapping the balls 36 into their respective seats 35 to eliminate surface irregularities in the seats 35 and assure a substantially leak-free seal as described in greater detail below.

Referring to FIG. 4, when the valve body 20 is in its normal or upright position as shown so that the shuttle members 36 are in their rest positions, the inlet 21 intersects the first branch 26 at a location 33 between the seat 35 and shuttle member 36 of the first branch 26 so that the ball 36 of the first branch 26 is remotely spaced from the path of fluid flowing from the inlet 21 to the first branch 26. Similarly, the first branch 26 intersects the second branch 27 at a location between the seat 35 and shuttle member 36 of the second branch 27 so that the ball 36 of the second branch 27 is remotely spaced from the path of fluid flowing from the first branch 26 to the second branch 27. Each of the plugs 28 includes a cylindrical ball cavity 38 for receiving its associated ball 36 when the valve body 20 is in its upright position and storing the ball 36 at a location remote from the flow path. Each plug 28 also includes a restrictive or reduced diameter cylindrical passage 39 of significantly smaller circumferential extent than the ball cavity 38 interposed between the ball cavity 38 and the location at which fluid enters the branch 26 or 27 of which the restrictive passage 39 and ball cavity 38 form a part. In the presently preferred embodiment, the diameter of each ball 36 is 0.203 inches (0.515 cm), the diameter of each ball cavity 38 is 0.238 inches (0.604 cm), and the diameter of each restrictive passage 39 is 0.215 inches (0.546 cm). Because the balls 36 are each of steel and the fluid flowing through the valve 16 is liquid gasoline, the balls 36 have a significantly greater specific gravity than the fluid and the net gravitational force acting on each ball 36 (that is, the difference between the weight of each ball and the buoyant force acting on each ball) is in a direction downward as viewed in FIG. 4 to urge each ball 36 into its associated cavity 38.

Figure 5:
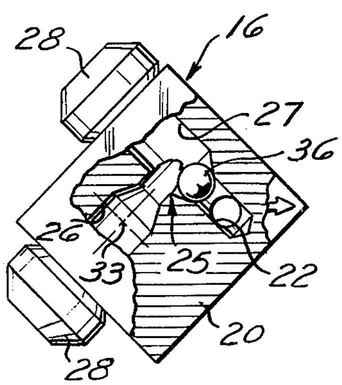
FIG. 5 is a view similar to FIG. 4 but showing the valve rotated 90° in a clockwise direction from the upright position shown in FIG. 4.

Turning now to the operation of the shut-off valve 16, the closing of the valve 16 as the vehicle 11 is tilted 90° about the longitudinal axis 17 clockwise as viewed from the rear of the vehicle 11 facing forwardly is illustrated in FIG. 5. This tilting would occur in the event the vehicle were lying substantially on its right side, and as shown in FIG. 5 the ball 36 in the second branch 27 of the shut-off passage 25 is closed against its respective valve seat 35. The actual angle at which the ball in the second passage 27 first closes against its associated seat upon this clockwise tilting of the vehicle is dependent primarily upon the angle 41 between a vertical line 40 and the centerline 31 of the branch 27 and is dependent secondarily upon the size of the ball and upon the sizes and angles of the various portions of the second branch 27. In the preferred embodiment shown in the drawing the ball first closes when the vehicle 11 and shut-off valve 16 are rotated through about 67°.

Figure 6:
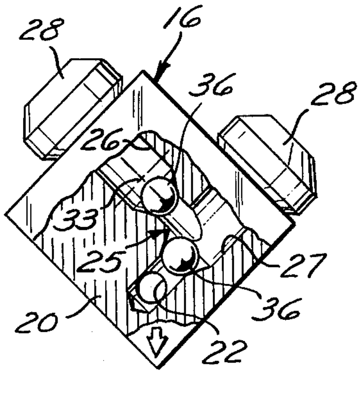
FIG. 6 is a view similar to FIG. 4 but showing the valve rotated 180° from the upright position shown in FIG. 4.
Figure 7:
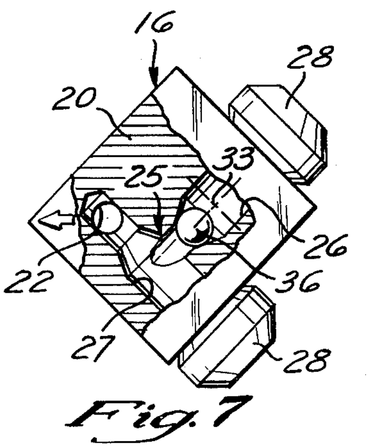
FIG. 7 is a view similar to FIG. 4 but showing the valve rotated 90° in a counterclockwise direction from the position shown in FIG. 4.

When the vehicle 11 and valve 16 are tilted through an angle of 180°, such as would occur in the event the vehicle 11 were lying on its top, both the valve in the first branch 26 and the valve in the second branch 27 are closed as shown in FIG. 6. During clockwise rotation of the shut-off valve 16 from the 90° position shown in FIG. 5 to the 180° position shown in FIG. 6, the ball in the second passage 27 remains closed. The ball in the first passage 26 first closes at a position which is dependent primarily upon the angle 42 between the vertical line 40 and the centerline 30 of the first branch 26 and which is also dependent secondarily upon the size of the ball and upon the sizes and angles of the various portions of the first branch 27.

When the vehicle 11 is tilted 90° counterclockwise as viewed from the rear of the car facing forwardly about the longitudinal axis 17, such as when the vehicle is lying on its left side, the ball in the first passage 26 rolls from its associated cavity to engage its associated seat to terminate flow from the inlet 21 to the outlet 22 of the valve. The exact angle of rotation at which the ball moves from the ball cavity to engage the valve seat in the first passage 26 during this counterclockwise rotation is dependent upon the factors set forth in the immediately preceeding paragraph. In the embodiment illustrated in the drawings, this angle is approximately 67°.

Figure 8:
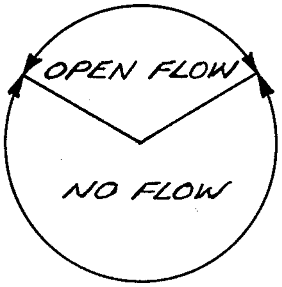
FIG. 8 is a flow diagram showing the angular displacement at which there is open flow and at which there is no flow through the valve shown in FIGS. 1 through 7.

FIG. 8 illustrates the angular displacement of the vehicle 11 and valve 16 about the longitudinal axis 17 at which there is open flow through the valve 16 and at which flow through the valve 16 is terminated. As shown in FIG. 8, open flow is maintained through the valve 16 only when the vehicle 11 is upright or when the vehicle 16 is tilted less than approximately 67° clockwise or counterclockwise from the upright position about the longitudinal axis 17.

As described above, the angle of rotation or tilt about the longitudinal axis 17 at which the valve 16 first closes is dependent primarily upon the angle 42 between the vertical line 40 and the centerline 30 of the first branch 26 and upon the angle 41 between the vertical line 40 and the centerline 31 of the second branch 27. In the preferred embodiment shown in the drawings these angles are each 45°. If either or both of the angles 41 and 42 are made smaller than that shown in FIG. 4, a greater tilt angle from the upright position in either or both directions about the longitudinal axis 17 will be required before closing of the first branch 26 or of the second branch 27. Similarly, if either or both of the angles 41 and 42 are made larger, the tilt in either or both directions about the longitudinal axis 17 at which closure occurs will be smaller.

In addition to closing when the vehicle 11 is tilted about the longitudinal axis 17, the valve 16 also closes when the vehicle 11 is rotated in either direction about the lateral axis 18. When the vehicle 11 is tilted 90° in either direction about the lateral axis 18, the centerlines 30 and 31 of the branches 26 and 27 will each lie in a substantially horizontal plane. Further tilting about the lateral axis 18 will then cause the balls 36 in the branches 26 and 27 to close against their associated valve seats 35.

With further regard to tilting of the vehicle 11 about the lateral axis 18, it is noted that it is more important for the valve 16 to close when the vehicle 11 is tilted clockwise about the axis 18 as viewed in FIG. 1 than it is for the valve 16 to close when the vehicle is tilted counterclockwise. This is because counterclockwise tilting of the vehicle 11 about the lateral axis 18 places the carburetor 15 in a position above the fuel tank 12 so that fuel does not leak from the tank 12 through the carburetor 15, whereas clockwise rotation of the vehicle 11 about the lateral axis 18 places the tank 12 in a position vertically above the carburetor 15. For this reason, in an alternative embodiment, the valve 16 may be mounted in the vehicle 11 with its forward end tilted downwardly by a predetermined angle when the vehicle 11 is in its normal or upright position. With this alternative arrangement, the valve 16 closes when the vehicle is tilted through an angle of less than 90° in a clockwise direction as viewed in FIG. 1 about the lateral axis 18.

Under normal operating conditions when the vehicle 11 is in its upright position or is tilted about the axes 17 or 18 less than the amount required for actuating the balls 36 to shut-off flow through the valve 16, the balls 36 are retained in the ball cavities 38. Because the flow of fuel from the inlet 21 through the branches 26 and 27 and out the outlet 22 produces turbulent flow and pressure differentials in the branches 26 and 27, there is a significant tendency for the balls 36 to be pulled into their associated seats 35 even when the shut-off valve 16 is in its normal upright position. To prevent such premature closing of the shut-off valve 16, each branch 26 and 27 is provided with the restrictive passage 39 described above between its ball cavity 38 and the location at which fuel enters the branch. The restrictive passage 39 substantially isolates the ball cavities 38 from such turbulent flow to provide a relatively quiescent area in the branches for storage of the balls, and also provides a mechanical barrier to prevent premature closing in the event that pressure gradients in the branches tend to pull the balls 36 out of their cavities 38.

In tests which were conducted on a test stand on the invention, it was found that the shut-off valve 16 having the ball cavities 38 and the restrictive passages 39 as shown in the drawings and described above resisted premature closing even at liquid fuel flow rates far in excess of the rates which could be expected in liquid gasoline engine powered motor vehicles. In comparison tests, the plug 28 in one of the branches was removed and a modified plug was substituted therefor in which the restrictive passage 39 and larger diameter ball cavity 38 were replaced with an elongated cylindrical ball cavity of uniform diameter equal to the diameter of passage 39. It was found that even when the axial length of the uniform ball cavity of the modified plug was extended to more than twice the total axial length of the cavity 38 and passage 39 shown in the drawing to move the ball 36 farther away from the flow path, the ball 36 in the modified plug closed at lower flow rates than were obtained in the tests on the valve 16 as shown in the drawings. Thus, the restrictive passage 39 and larger diameter cavity 38 prevent premature closing of the valve 16 and eliminate the need for a ball storage cavity of excessive axial length to prevent flow actuation of the valve.

Although a preferred embodiment of the invention has been shown and described in detail, various modifications and rearrangements may be made. For example, although a liquid gasoline powered vehicle fuel system has been shown in the preferred embodiment, the present invention also finds application in other types of fluid systems and in other locations within such systems.

What is claimed is:

1. A tilt responsive shut-off valve comprising a valve body having an inlet passage and an outlet passage and a shut-off passage, said shut-off passage having a first branch and a second branch, said first branch having a first gravity-influenced tilt responsive valve means constructed and arranged to block communication between said inlet passage and outlet passage when said valve body is tilted in one direction about an axis from a normal position, said second branch having a second gravity-influenced tilt responsive valve means constructed and arranged to block communication between said inlet passage and outlet passage when said valve body is tilted from said normal position in another direction about said axis, each of said tilt responsive valve means including a valve seat and a shuttle closure member, said shuttle closure member of each of said tilt responsive valve means being disposed in a rest position spaced from its associated valve seat to open communication between said inlet and said outlet when said valve body is in said normal position, said inlet intersecting said first branch between its associated shuttle closure member and valve seat when said valve body is in said normal position, said first branch intersecting said second branch between its associated shuttle closure member and valve seat when said valve body is in said normal position, and said outlet intersecting said second branch downstream of its associated valve seat, said first and second branches each having portions thereof substantially inclined with respect to a horizontal direction when in a normal position whereby said valve is required to tilt through substantial angles in both directions from the normal position to block communication between the inlet and outlet passages by gravity influence on said valve means, said branches being arranged in a generally right angle configuration, with said first branch forming one leg of the right angle and said second branch forming the other leg of the right angle when viewed in a direction along said axis.

2. A tilt responsive shut-off valve as defined in claim 1 wherein said first tilt responsive valve means is constructed and arranged to block communication between said inlet passage and outlet passage when said valve body is tilted in a direction about an axis substantially perpendicular to said first-mentioned axis.

3. A tilt responsive shut-off valve as defined in claim 2 wherein said second tilt responsive valve means is constructed and arranged to block communication between said inlet passage and outlet passage when said valve body is tilted in another direction about said second-mentioned axis.

4. A tilt responsive shut-off valve comprising a valve body having an inlet passage and an outlet passage and a shut-off passage, said shut-off passage having a first branch and a second branch, said first branch having a first tilt responsive valve means constructed and arranged to block communication between said inlet passage and outlet passage when said valve body is tilted from a normal position in one direction about an axis and when said valve body is tilted from said normal position in one direction about another axis substantially perpendicular to said first-mentioned axis, said second branch having a second tilt responsive valve means constructed and arranged to block communication between said inlet passage and outlet passage when said valve body is tilted from said normal position in another direction about said first-mentioned axis and when said valve body is tilted from said normal position in another direction about said other axis, each of said tilt responsive valve means including a valve seat and a shuttle closure member, and said shuttle closure member of each of said tilt responsive valve means being disposed in a rest position spaced from its associated valve seat and out of a flow path of fluid between said inlet and outlet to open communication between said inlet and said outlet when said valve body is in said normal position, each of said branches having portions disposed at a predetermined angle greater than zero to a vertical line, said branch portions being arranged in a generally right angle configuration, with the first branch portion forming one leg of the right angle and the second branch portion forming the other leg of the right angle when viewed in a direction along said first-mentioned axis.

5. A tilt responsive shut-off valve comprising a valve body having an inlet and an outlet and a shut-off passage, said shut-off passage having a tilt responsive valve means, said tilt responsive valve means being constructed and arranged to block communication between said inlet and outlet when said valve body is tilted in one direction about an axis from a normal position, said tilt responsive valve means including a valve seat and a ball, said shut-off passage including a ball cavity of predetermined diameter storing said ball in a rest position spaced from said valve seat to open communication between said inlet and said outlet when said valve body is in said normal position, said inlet intersecting said shut-off passage between said valve seat and said ball cavity, said outlet intersecting said shut-off passage downstream of said valve seat, and said shut-off passage including a restrictive passage of smaller diameter than said ball cavity between said ball cavity and the location at which said inlet intersects said shut-off passage, said restrictive passage being defined by a generally circular aperture substantially coaxially disposed with respect to said ball cavity, said restrictive passage being adapted to prevent flow-induced movement of said ball towards said valve seat.

6. A tilt responsive shut-off valve comprising a valve body having an inlet passage and an outlet passage and a shut-off passage, said shut-off passage having a first branch and a second branch, said first branch having a first tilt responsive valve means constructed and arranged to block communication between said inlet passage and outlet passage when said valve body is tilted in one direction about an axis from a normal position, said second branch having a second tilt responsive valve means constructed and arranged to block communication between said inlet passage and outlet passage when said valve body is tilted from said normal position in another direction about said axis, each of said tilt responsive valve means including a valve seat and a ball closure member, said ball closure member of each of said tilt responsive valve means being disposed in a rest position spaced from its associated valve seat to open communication between said inlet and said outlet when said valve body is in said normal position, said inlet intersecting said first branch between its associated ball closure member and valve seat when said valve body is in said normal position, said first branch intersecting said second branch between its associated ball closure member and valve seat when said valve body is in said normal position, and said outlet intersecting said second branch downstream of its associated valve seat, said first and second branches each including a ball cavity of predetermined circumferential extent storing its associated ball closure member when such ball closure member is in its rest position and a restrictive passage of smaller circumferential extent than the respective ball cavity, the restrictive passage of said first branch being disposed between its ball cavity and the location at which said inlet passage intersects said first branch, the restrictive passage of said second branch being disposed between its ball cavity and the location at which said first branch intersects said second branch.

* * * * *